United States Patent [19]

Miller et al.

[11] Patent Number: 5,727,002
[45] Date of Patent: Mar. 10, 1998

[54] METHODS FOR TRANSMITTING DATA

[75] Inventors: C. Kenneth Miller, Concord; Kary Robertson, Newburyport, both of Mass.; Kenneth Cates, Salem, N.H.; Marc White, Wayland, Mass.

[73] Assignee: Starburst Communications Corporation, Concord, Mass.

[21] Appl. No.: 585,948

[22] Filed: Jan. 16, 1996

Related U.S. Application Data

[63] Continuation-in-part of Ser. No. 375,493, Jan. 19, 1995, Pat. No. 5,553,083.

[51] Int. Cl.$^6$ ............... H04L 1/16; G06F 13/00
[52] U.S. Cl. ............... 371/32; 395/200.01; 395/200.12
[58] Field of Search ............... 371/32, 33; 395/200.01, 395/200.04, 200.11, 200.12

[56] References Cited

U.S. PATENT DOCUMENTS

| | | | |
|---|---|---|---|
| 4,493,021 | 1/1985 | Agrawal et al. | 364/200 |
| 4,554,656 | 11/1985 | Budrikis et al. | 370/85 |
| 4,759,015 | 7/1988 | Takai et al. | 370/86 |
| 4,888,767 | 12/1989 | Furuya et al. | 370/95.2 |
| 4,914,654 | 4/1990 | Matsuda et al. | 370/94.1 |
| 4,937,819 | 6/1990 | King | 370/95.3 |
| 5,296,936 | 3/1994 | Pittas et al. | 358/407 |
| 5,553,083 | 9/1996 | Miller | 371/32 |
| 5,572,678 | 11/1996 | Homma et al. | 395/200.12 |

FOREIGN PATENT DOCUMENTS

| | | |
|---|---|---|
| 0 303 830A2 | 2/1989 | European Pat. Off. . |
| 0 437 072 A1 | 7/1991 | European Pat. Off. . |
| 0 552 794 A2 | 7/1993 | European Pat. Off. . |
| 91/13503 | 2/1991 | WIPO . |
| 95/26088 | 10/1995 | WIPO . |

OTHER PUBLICATIONS

Henriksen et al., "A Transport Protocol Supporting Multicast File Transfer over Satellite Links", '92 International Phoenix Conference on Computers and Communications, pp. 590–596.

Shacham, "Multipoint Communications by Hierarchically Encoded Data", INFOCOM '92, pp. 2107–2114.

Shachum, "Multicast Routing of Hierarchical Data", ICC '92, pp. 1217–1221.

(List continued on next page.)

*Primary Examiner*—Stephen M. Baker
*Attorney, Agent, or Firm*—Testa, Hurwitz & Thibeault, LLP

[57] ABSTRACT

A data transmission method quickly and reliably transfers data (e.g., a computer file) from a source to recipients. While the frames are being transmitted, negative acknowledgments from recipients are received by the source. These acknowledgments indicate which frames require retransmission. After all frames have been transmitted out, a retransmission is performed by the source for only those frames which the acknowledgments indicate require retransmission. Additional retransmissions can occur. This multi-pass data transfer technique requires only negative acknowledgements to be sent by the recipients. Features include the ability to set the transmission rate and to define multicast groups. Also, it is possible to determine the capacity of links of unknown capacity using a "multicast network probe" feature of the invention, and to determine the frame error rates of known-capacity links by utilizing the same feature. A "multicast ping" feature of the invention can be used to determine the connectivity between a source and members of a multicast group. "Speed groups" can be set up after determining link capacities, or if they are already known, whereby the recipients connected to the source by the fastest links receive all of the data while slower-link recipients receive only a portion of the data, on the first pass. The number of recipients which can receive the data from the source can be greatly increased by using a "negative acknowledgement collection" scheme whereby "replication points" (preferably routers) collect individual negative acknowledgements and forward them as a unit to the next level.

18 Claims, 9 Drawing Sheets

OTHER PUBLICATIONS

International Searching Authority/European Patent Office, International Search Report, Dec. 5, 1996.

IEEE Transactions on Communications, vol. 41, No. 5, May 1993, "Error and Flow Control Performance of a High Speed Protocol", B. Doshi et al., pp. 707–720.

IEEE Transactions on Communications, vol. COM–33, No. 3, Mar. 1985, "Multidestination Protocols for Satellite Broadcast Channels", Sabnani et al., pp. 232–240.

IEEE Transactions on Communications, vol. 41, No. 12, Dec. 1993, "Optimal Adaptive Multireceiver ARQ Protocols", Wang et al., pp. 1816–1829.

1994 International conference on Network Protocols, Oct. 1994, "Multicast Transport Protocols for High Speed Networks", Paul et al., pp. 4–14.

Stanford University, "Host Extensions for IP Multicasting", S. Derring, Aug. 1989, pp. 1–17.

3rd European Conference on Satellite Communications, Nov. 1993, "New ARQ–Scheme for Multicast Satellite Communication", Quernheim et al., pp. 11–15.

Electronics Letters, vol. 24, No. 11, May 1988, "Continuous Multidestinatioin ARQ Schemes for High Error–Rate Channels", Cho et al., pp. 694–695.

International Searching Authority/European Patent Office, Invitation to Pay Additional Fees and Partial International Search Report, Jul. 22, 1996.

"A New ARQ–Scheme for Multicast Satellite Communication", by U. Quernheim et al., 3rd European Conference On Satellite Communications, Nov. 1993, pp. 11–15.

Electronics Letters, vol. 24, No. 11, May 26, 1988, "Continuous Multidestination ARQ Schemes For High Error–Rate Channels", pp. 694–695.

"Host Extensions for IP Multicasting", by S. Deering, Aug. 1989, pp.1–17.

IEEE Computer Society, Oct. 1994, "Multicast Transport Protocols For High Speed Networks", by S. Paul et al., pp. 4–14.

IEEE Transactions on Communications, No. 12, Dec. 1993, "Optimal Adaptive Multireceiver ARQ Protocols" by Wang et al., pp. 1816–1829.

IEEE Transactions of Communications, vol. Com–33, No. 3, Mar. 1985, "Multidestination Protocols for Satellite Broadcast Channels", by Sabnani et al., pp. 232–240.

"The Internet Multicasting Service", Release 1.0, v94, n2, p10(6), Feb. 18, 1994, Dialog printout.

Comer, *Internetworking with TCP/IP, vol. 1, Principles, Protocols, and Architecture, Second Edition*, Prentice Hall, 1991, Chapter 23, pp. 377–390.

Waters, A., et al., "Broadcast File Distribution Protocols for Satellite Networks", IEEE Telecommunications Conf., pp. 133–138, 1989.

Henriksen, E., et al, "A Transport Protocol Supporting Multicast File Transfer Over Satellite Links", Int'l. Phoenix Conf. on Computers and Communications, 590–596, 1992.

"IBM Japan Develops New Communication Protocol", news article, Nov. 3, 1995.

"TRIView Manger" brochure by Tactix ReEngineering, four pages.

Heterogeneous Multicast IP Network
(e.g., Mbone)

METHODS FOR TRANSMITTING DATA

CROSS-REFERENCE TO RELATED APPLICATION

This is a continuation-in-part of U.S. patent application Ser. No. 08/375,493 (attorney docket no. PSM-001) which was filed on Jan. 19, 1995, now U.S. Pat. No. 5,553,083.

FIELD OF THE INVENTION

This invention relates to data transmission, and more particularly, to fast and reliable multicast transmissions of files from a server to clients.

BACKGROUND OF THE INVENTION

Computer networks, such as wide area networks (WANs), can provide unicast, multicast, and broadcast services to allow communication between network participants such as a server node and one or more client nodes. Multicast frame relay is a service used to communicate over a computer network. Multicast IP technology is another service used to communicate over a computer network. Broadcast frame relay is a service used to communicate over a satellite network. The term "broadcast" refers to a server node sending information to all of the client nodes connected to the network. The term "multicast" refers to a server node sending information to a subset of all of the client nodes connected to the network. Broadcast and multicast are network capabilities which are relatively new over WANs.

Some information providers desire to deliver information electronically by broadcasting or multicasting the information from a server node at a central location to one or more client nodes at remote customer locations via a computer network to which the server and the clients are coupled. Because broadcast and multicast network services do not provide for acknowledgment of the delivered information at all, these services can be unreliable. Such unreliability generally is undesirable and unacceptable to information providers.

A common protocol suite in use in computer networks is TCP/IP, which is the protocol used in the Internet. TCP stands for Transmission Control Protocol, and IP stands for Internet Protocol. Two file transfer protocols are available in association with TCP/IP: (i) File Transfer Protocol (FTP) which runs as an application on top of TCP and (ii) Trivial File Transfer Protocol (TFTP) which runs on top of UDP. UDP stands for User Datagram Protocol. Both TCP and UDP are transport protocols which are responsible for end-to-end delivery of information across an internetwork, i.e., a network of networks.

Both FTP and TFTP support point-to-point (i.e., unicast) file transfers only. FTP depends on TCP for reliable delivery, as TCP is a connection-oriented acknowledged transport protocol. TFTP provides its own acknowledgments for reliability, as it runs on top of UDP which is a connectionless transport service that does not support acknowledgment.

Connection-oriented protocols such as TCP require setup and tear-down of virtual circuit connections. Because of their relatively high overhead, TCP and similar protocols are undesirable in networks with inherently poor connections such as Cellular Digital Packet Data (CDPD) networks. CDPD utilizes TCP/IP as the primary protocol suite used in the network. CDPD wireless networks recommend applications operate over UDP (the connectionless transport layer) only, and thus TFTP is the file transfer protocol of choice for CDPD.

TFTP breaks files up into packets having 512 bytes of data each, and it then sends each data packet one at a time. After each data packet is sent, TFTP causes the sending node to wait for an acknowledgment from the receiving node(s) before the sending node is allowed to send the next data packet. TFTP is described, for example, in a book by Douglas E. Comer (*Internetworking with TCP/IP, Volume 1, Principles, Protocols, and Architecture, Second Edition*, Prentice Hall, 1991, Chapter 23, pages 377–390).

While acknowledgment is a part of TFTP, the acknowledgment scheme used in TFTP becomes very inefficient as network delay becomes significant and/or is different for two or more of the receiving nodes. Like TFTP, some other known data transfer mechanisms require packet-by-packet acknowledgment, and thus these other mechanisms also are relatively slow at transferring the entire amount of data.

SUMMARY OF THE INVENTION

It is an object of the present invention to provide both fast and reliable transmission of files from a server to one or more clients over a communications link. The file transfer preferably is a multicast transmission to clients. In general, file transfer according to the invention will not suffer any reduction in speed, reliability, or efficiency in the face of link delay, even if that delay is significant and/or different for two or more of the receiving clients. The invention provides an ideal mechanism for distributing computer software files electronically.

The communications link, which couples the server to the clients and allows communication therebetween, can be a computer network (e.g., a LAN, a WAN, the Internet), a wireless network (e.g., a packet cellular data network such as CDPD), some combination of these types of communication mediums, or some other communication medium such as, for example, a satellite network which generally is a high-speed, high-delay network.

In accordance with the invention, the clients send only negative acknowledgments back to the server as the server is sending the data files. The communication is continuous. That is, the server does not stop sending the data to wait for the negative acknowledgments from the clients, but instead the server receives the clients' negative acknowledgments as the server is transmitting the data. The clients' negative acknowledgments indicate to the server which particular packets need to be resent. A packet may need to be resent because, for example, it was either not received or received in error by one or more of the clients. After the server has sent the entire amount of data (e.g., the entire file) over the link to the clients, the server performs a second round of transmissions in which it only resends the particular packets indicated by the clients as requiring retransmission. During this second round, clients still only send negative acknowledgements (i.e., indications of packets not received at all or not received correctly). The process can then continue with as many additional rounds of retransmissions as is required so that each of the clients correctly receives all of the packets. Alternatively, the retransmission rounds can be repeated a predetermined number of times, which number can be modified (i.e., the number is configurable). Each subsequent round typically involves the transmission of fewer packets than the previous round, as only previous packets in error are resent.

This scheme quickly and reliably transfers data from a server to one or more clients. It is quick because the server is allowed to transfer the entire file without stopping at packet boundaries to wait for negative acknowledgments from the clients for the packet just sent. That is, data transfer is not directly tied to negative acknowledgments in that each round of data transfer continues regardless of any particular client's reception problems and/or regardless of any link delay issues (e.g., a difference in the time it takes a packet to travel from the server to a certain client and the time it takes a packet to travel from the server to another different client). Also, each subsequent round of transmission only involves the sending of packets which were not received, or received in error, during the previous round, and therefore the server generally does not ever need to send the entire file more than once. It is reliable because it strives to provide each client with every packet, and the reception problem of any individual client generally does not affect the other clients' reception speed and accuracy.

Data transfer according to the invention does not require or expect positive acknowledgements from any of the clients. A positive acknowledgement is implicit if a negative acknowledgement is not received back at the server. Moreover, in accordance with the invention, a plurality of negative acknowledgements preferably are collected and sent back to the server as a "multiple selective reject negative acknowledgement." Typically, more than one of these multiple selective reject negative acknowledgements are sent back to the server during, for example, the first round of transmissions from the server to the clients. One multiple selective reject negative acknowledgement can represent hundreds of individual negative acknowledgements. The use of these collections of negative acknowledgements can greatly reduce traffic over the link and free up bandwidth on the link for the transfer of data from the server to the clients and for other uses. With the invention, the server and the link generally do not get choked with individual negative acknowledgements all coming back at the same time or within a short window of time. This reduction in the number of individual acknowledgements being sent over the link to the server also results in the benefit and significant advantage of improved scalability. That is, with the use of multiple selective reject negative acknowledgements, the number of clients to which a file can be sent increases due to the reduced acknowledgement traffic coming back to the server.

In a preferred embodiment of the invention, the entire amount of data to be transferred (e.g., a file) is separated into a plurality of blocks, where each block includes a plurality of packets. The server completes a round when it finishes transmitting all blocks (e.g., the entire file). After a complete block has been transmitted, the clients send their negative acknowledgments back to the server via a return unicast communications path. Block boundaries trigger the sending of negative acknowledgments by the clients. As the negative acknowledgments are coming into the server from the clients for block N, the server is transmitting block N+1 (or a subsequent block) out to the clients or the server has finished transmitting all of the blocks.

The following features are provided according to the invention. There is the ability to set the transmission rate and to define multicast groups. Also, it is possible to determine the capacity of links of unknown capacity using a "multicast network probe" feature, and to determine the frame error rates of known-capacity links by utilizing the same feature. A "multicast ping" feature can be used to determine the connectivity between a source and members of a multicast group. "Speed groups" can be set up after determining link capacities, or if they are already known, whereby the recipients connected to the source by the fastest links receive all of the data while slower-link recipients receive only a portion of the data, on the first pass. The number of recipients which can receive the data from the source can be greatly increased (e.g., by a factor of 1000 or more) by using a "negative acknowledgement collection" scheme whereby "replication points", preferably routers, collect individual negative acknowledgements and forward them as a unit to the next level.

It is noted that the terms 'packet', 'datagram', and 'frame' are used interchangeably herein to identify the same thing, namely a unit of data or information which may have a source and destination address as part thereof and which is sent across the link.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
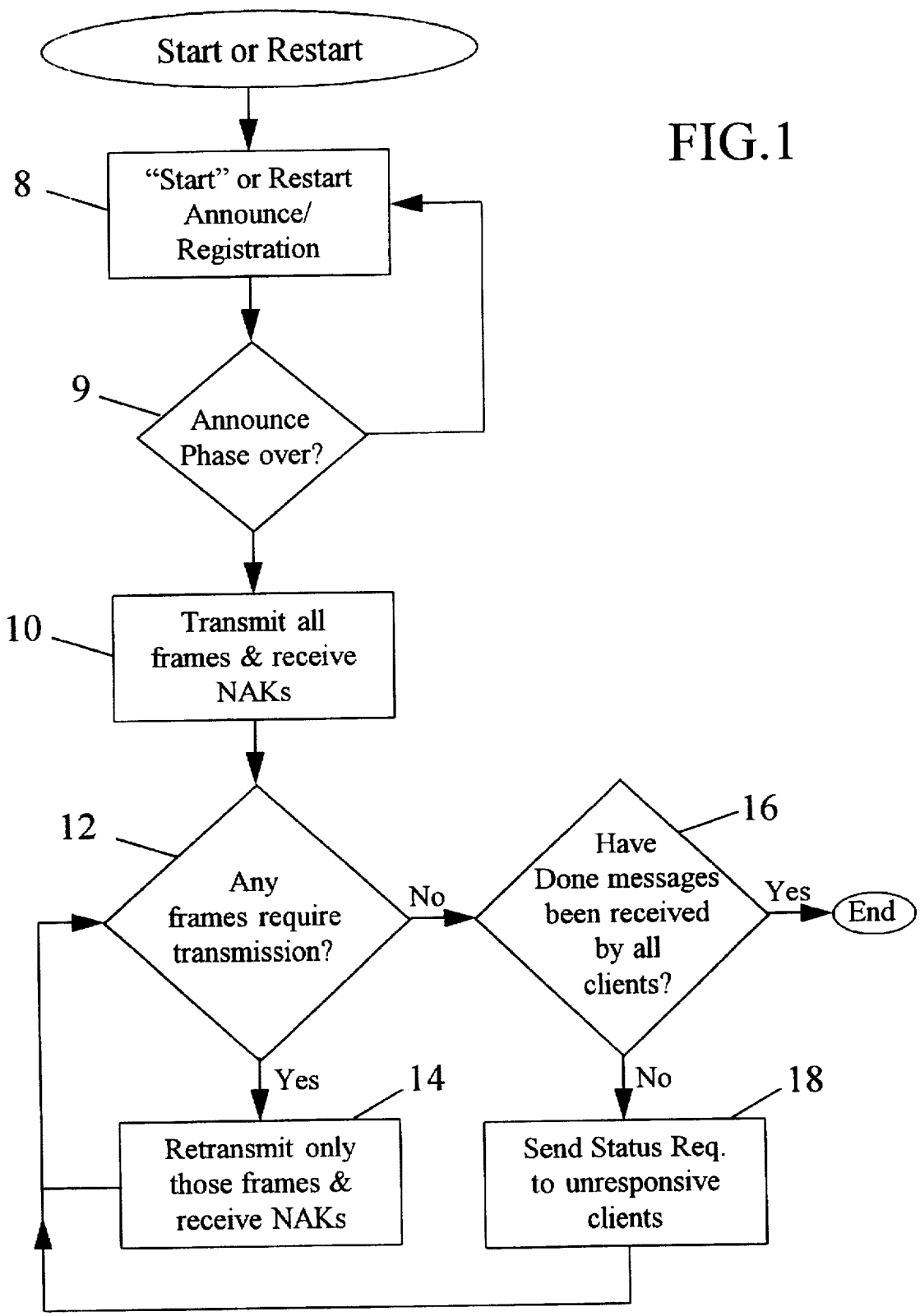
FIG. 1 is a flowchart of data transmission operations according to the invention.
Figure 2:
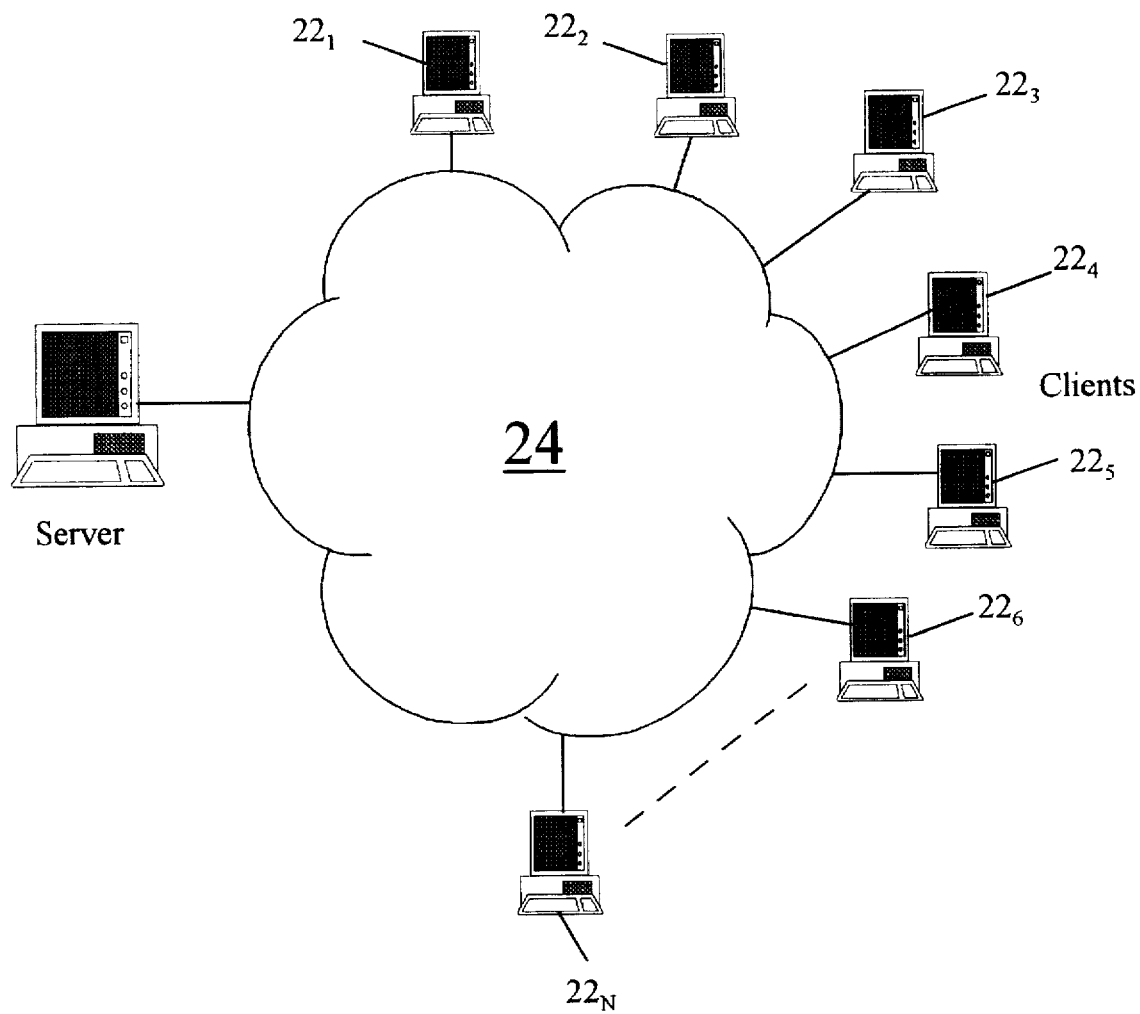
FIG. 2 is a diagram of a physical configuration which allows a server to communicate with one or more clients.

Referring to FIGS. 1 and 2, in accordance with the invention, quick and reliable data transmission from a source or server 20 to one or more recipients or receivers or clients $22_1, 22_2, \ldots, 22_N$ over a communications link 24 comprises (step 10) transmitting the data (e.g., a file), which is in the form of a plurality of frames, over the link 24 to one or more of the recipients 22 until the entire file (i.e., all of the plurality of frames) have been transmitted over the link 24. As the frames are being transmitted, frame negative acknowledgments from one or more of the recipients 22 are received via the link 24 (step 10). If, after the entire file has been transmitted over the link 24, the negative acknowledgments indicate that certain frames need to be retransmitted over the link 24 (step 12), only those certain frames are retransmitted (step 14). As those certain frames are being retransmitted over the link 24, frame negative acknowledgments from one or more of the recipients 22 are received via the link 24 (step 14). This process is then repeated as many times as necessary until no more frames need to be retransmitted, as indicated by steps 12, 14, and 16. In step 16, the server 20 determines whether "done" messages have been received at the server 20 by all of the recipients 22. If a recipient is "done," it means that recipient has received all of the frames and has sent to the server 20 a "done" message to so indicate. "Done" recipients continue to send "done" messages to the server until they see their name in a "done list" which the server sends out as a notification to all "done" recipients (i.e., those listed in the "done list") to stop sending "done" messages to the server. After a predetermined period of time or after a predetermined event, the server 20 sends a status request to all unresponsive recipients 22, i.e., recipients from which it has not received a "done" message (step 18). The initial transfer of the entire file and each of the subsequent transmissions of error frames are generally referred to herein as a "round" or "pass".

In the first pass, the server 20 preferably multicasts the file to a subset of all of the clients 22. At least two of the clients 22 typically have a different server-to-client frame transmission delay associated therewith. Data transmission according to the invention is unaffected by such delay differences even if significant and even if every client 22 has a different delay associated therewith.

The link 24 can be a computer network (e.g., a LAN, a WAN, the Internet), a wireless network (e.g., a cellular data network), some combination of these two types of communication mediums, or some other communication medium such as, for example, a satellite network which typically are high-speed, high-delay. The plurality of frames transmitted over the link 24 during the first round can together represent a computer data file being transferred from the server 20 to one or more of the clients 22.

Figure 5:
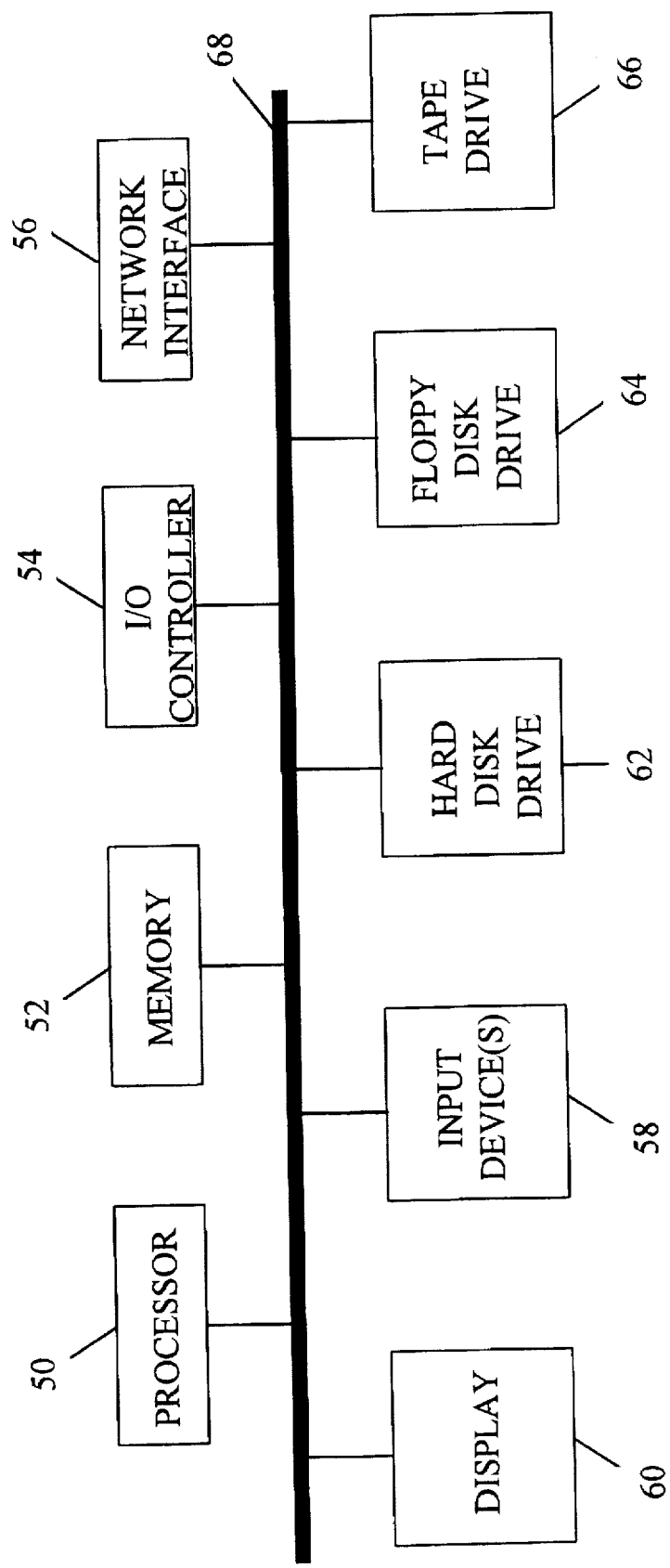
FIG. 5 is a simplified block diagram of a server in which at least a portion of the present invention can be embodied.

The server 20 and the clients 22 can be computers, such as PCs or workstations, running any one of a variety of operating systems including DOS. Referring to FIG. 5, the server 20, regardless of what type of computer it is, typically includes a central processor 50, a main memory unit 52 for storing programs and/or data, an input/output controller 54, a network interface 56, one or more input devices 58 such as a keyboard and a mouse, a display device 60, a fixed or hard disk drive unit 62, a floppy disk drive unit 64, a tape drive unit 66, and a data bus 68 coupling these components to allow communication therebetween. Each of the client computers 22 generally includes all or some of the components included in the server 20 of FIG. 5.

In some embodiments, one or more computer programs define the operational capabilities of the server 20 and the clients 22. The programs can be loaded into the server 20 and the clients 22 via the hard drive 62, the floppy drive 64, and/or the tape drive 66. Alternatively, the programs can reside in a permanent memory portion (e.g., a ROM chip) of the main memory 52. In some other embodiments, the server 20 and/or the clients 22 can include specially-designed, dedicated, hard-wired electronic circuits which perform all functions described herein without the need for instructions from computer programs. The invention can be used, for example, to load quickly and reliably new revision levels of the client software electronically from the server onto one or more of the clients.

Figure 3:
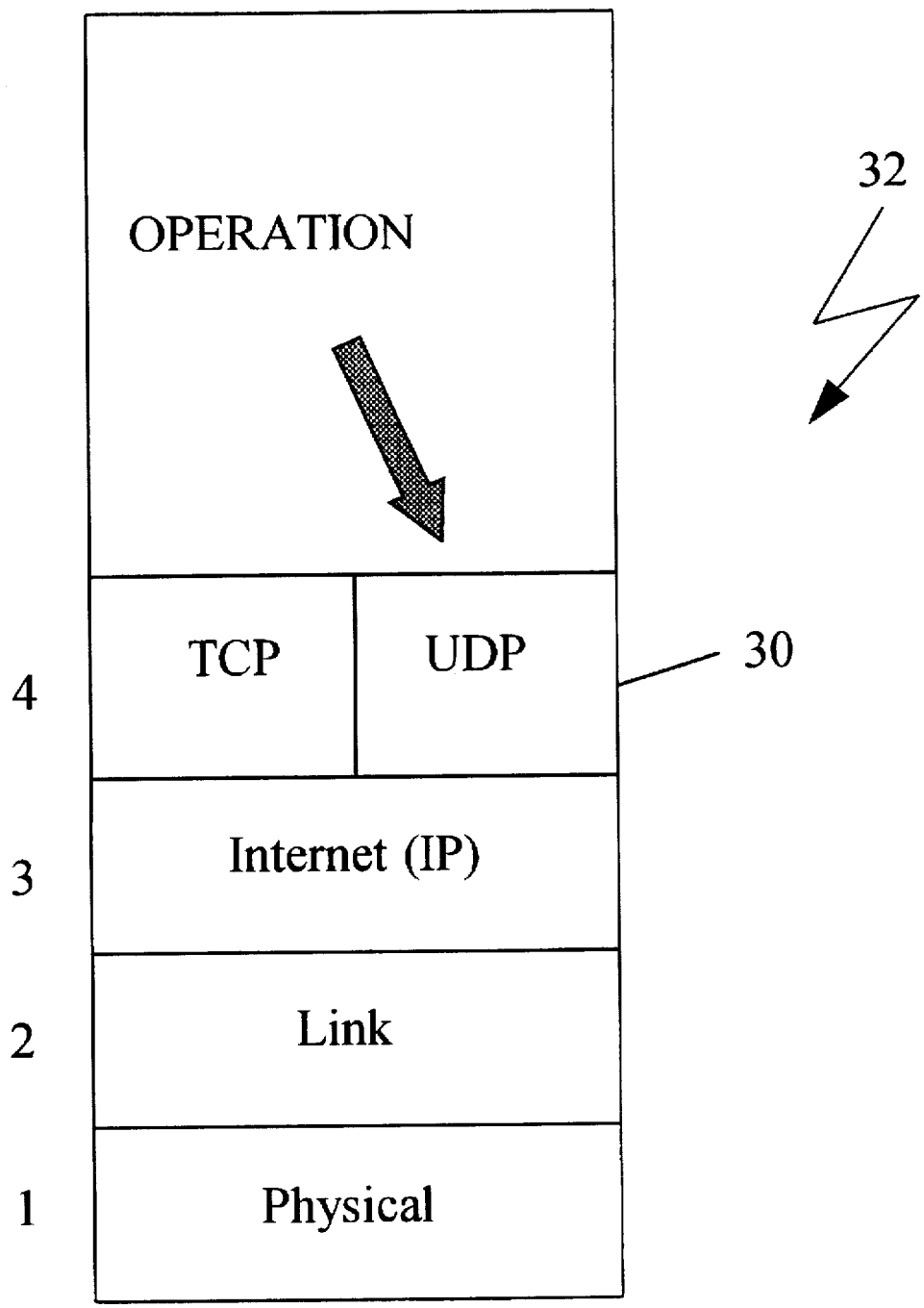
FIG. 3 is a diagram showing the location of an embodiment of the invention in relation to the TCP/IP protocol stack.

Referring to FIG. 3, the invention preferably operates at the application layer 30 of the TCP/IP protocol stack 32 on top of UDP. The invention also could operate at the application layer above the connectionless transport layer present in other protocol stacks such as IPX in the NetWare SPX/IPX protocol suite. UDP stands for User Datagram Protocol, and it is the TCP/IP standard protocol that allows an application program on one computer to send a datagram to an application program on another computer. UDP uses the Internet Protocol (IP) to deliver datagrams. UDP datagrams differ from IP datagrams in that UDP datagrams include a protocol port number which allows the sender of the datagram to distinguish among multiple destinations (i.e., application programs) on the receiving computer. UDP datagrams also typically include a checksum for the data being sent.

In general, data transmission according to the invention includes four aspects: IDLE, ANNOUNCE/REGISTRATION, TRANSFER, and COMPLETION. In the IDLE state, there is no activity. When a collection of data (e.g., a file) is selected for transmission by the server 20, the ANNOUNCE/REGISTRATION phase is entered. During any of the four phases, all files are available to an operator at the server 20.

ANNOUNCE/REGISTRATION

In this phase (step 8 in FIG. 1), the server ANNOUNCES to the clients that a file is about to be transferred and provides the parameters associated with the transfer of the file. The maximum duration of this phase is expressed in minutes, and it is configurable. An ANNOUNCE message is used to set up multicast groups, and Class D addresses are used in the assignment of multicast groups.

Clients are obliged to register with the server that they received an ANNOUNCE message. When a client sees the ANNOUNCE message, the client verifies that it is associated with the group identified in the message. It is implicit in the receiver being able to process the ANNOUNCE message that the receiver has a correct server IP address and a correct port number. The clients automatically respond to ANNOUNCE packets with REGISTRATION packets until they see their address in a registered client list in a subsequent ANNOUNCE packet. The REGISTRATION packet acts as a positive acknowledgment to the server about the client's participation. Once the server receives the client's REGISTRATION packet, the server adds the client to the client list in the next broadcast of the ANNOUNCE packet. The client list is maintained by the server. When the client receives an ANNOUNCE packet with the client's ID in the client list, registration for the client is complete. When all expected receivers have responded to the ANNOUNCE message or the ANNOUNCE timeout has expired, whichever comes first, actual transmission of the file will begin. This registration indicates that the client can participate in the group, as it has the resources to handle the file about to be sent. To prevent unwanted participation, encryption key exchange can take place at group setup. Once file transfer begins, ANNOUNCE packets cease to be sent, and the ANNOUNCE phase is over (step 9 in FIG. 1).

All the characteristics of the file transmission are transmitted in the ANNOUNCE packet. On receiving this ANNOUNCE message, the client responds with a unicast datagram to the server. The response indicates whether or not the receiver has the facilities to receive the file. It also indicates, in the case of an aborted transmission, whether the client has enough context to resume the transmission (a "restart" as indicated in FIG. 1). The duration of the announce period in some instances should allow for an operator at the server site to initiate a call to the client site indicating that the computer is either not available or does not have the facilities for the transfer. At the client site, the corrections could be made either manually or, if so configured, under remote control from the server to free up resource so it can participate in the transfer.

At any point in time throughout the transmission, the client may respond to this packet indicating that it aborted the transmission from its end indicating the reason in the message. If a transfer is broken off before completion, the invention is able to resume later without resending parts of the file already sent successfully ("restart" in FIG. 1). This is an especially important and useful feature when sending very large files. To achieve this feature, a client does not discard a partially received file. Instead, the clients store partially received files. If there are problems that prevent all clients (e.g., all clients in a multicast group) from receiving the entire file when it is first being sent (e.g., the link is terminated for some reason during file transmission), the transmission can be restarted later to complete the transfer. During a restart, the server queries all clients for a list of data frames that were missed, and then the server begins the completion of the transfer by sending only those frames. Thus, in FIG. 1, for a restart, step 10 involves a transmission that starts first with the frames that were missed (i.e., Nak'd) during the initial aborted transmission, instead of starting with the first frame of the first block of the file as would happen in an unaborted normal start of a transfer.

TRANSFER

Upon entering the data transfer phase, a transmission log is maintained at the server. This log is always on, and it keeps track of all events. Each of the clients also maintains a transmission log. The log maintained at each of the clients is mentioned hereinafter under the "COMPLETION" heading.

As files having 2 gigabytes of data or more can be transferred, holding the entire file in memory at the server for the extent of the transfer generally is unrealistic. The number of clients which are to receive the file can be 1000 or more, and thus halting transmission to wait for acknowledgments from each of them before continuing on to the next block transfer is unacceptable.

Figure 4:
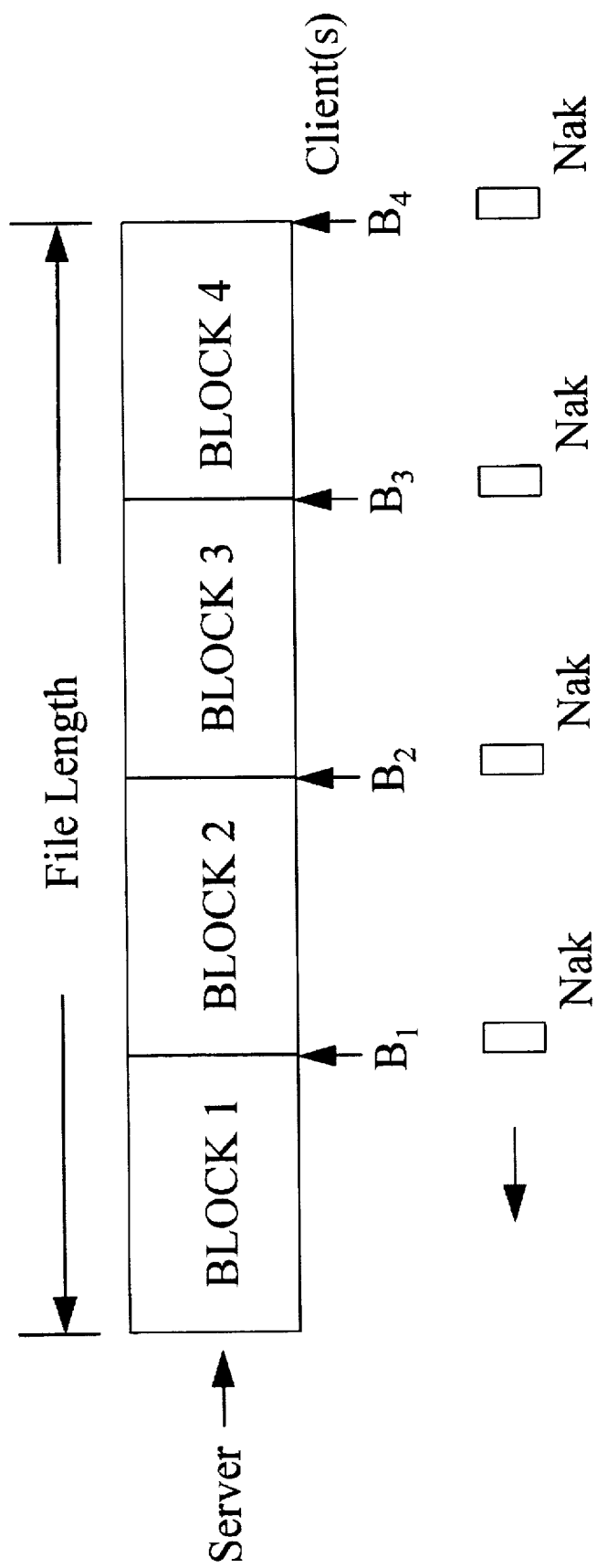
FIG. 4 is a diagram of a "first pass" block and frame transmission and acknowledgment process according to the invention.

The server logically breaks each file to be transferred into blocks of frames, and each block typically includes a plurality of frames and possibly thousands of frames. Referring to FIG. 4, in one example, the server 20 has broken a file into four blocks, namely, Block 1, Block 2, Block 3, and Block 4 ,wherein each block includes one or more frames. Each block represents a unit that will be negatively acknowledged (only, no positive acknowledgements) by every client participating in a transfer when the client determines that a block has been sent by the server. The client detects this by a change in block number in data packets received, because each frame sent indicates its block number and its frame number within that block. Breaking the file into blocks provides at least two advantages: (i) decreasing the number of negative acknowledgments required; and (ii) reducing the memory requirements in the server for determining next file pass transfer blocks.

Data transfers are not directly tied to the negative acknowledgments. Transfer continues regardless of missed negative acknowledgments or previously missed data packets by any individual client. This allows simplicity of design and ensures that individual client problems provide minimal impact on the group as a whole. Note also that clients are responsible for sending block negative acknowledgments based on what they hear from the server.

Referring to FIG. 4, the server starts the transfer by sending the first frame of the first block (i.e., the first frame of $Block_1$). The server sends the frames at a rate that is configurable. This represents the basic transfer rate that may be throttled back (i.e., decreased) based on performance. The server continues sending the frames of the file until the complete file has been sent once into the network (i.e., until $Block_1$ through $Block_4$ are sent). This is defined as the first pass or first round, and it takes an amount of time represented in FIG. 4 as "$B_4$". Some clients may receive the complete file (i.e., all four blocks) correctly after the first pass, in which case they have finished receiving the file. Clients receiving one or more frames in error, or not receiving one or more frames at all, require the resending of certain "pieces" of the file (i.e., the erroneously-received or missed frames) in subsequent passes or rounds. Each subsequent pass or round requires the transmission of fewer frames because only frames negatively acknowledged (i.e., frames not received or received in error) in the previous round get retransmitted in the subsequent round.

A maximum pass count or a maximum time to complete can be a configurable parameter. There may be clients that have not received all of the file correctly by the time of a maximum pass or a maximum time duration. These clients are identified by the server, and the server can take further action to get these clients the rest of the information via, for example, a unicast file transfer process. In the preferred embodiment, the clients send "done messages" indicating they've received the whole file and the server sends "done lists" indicating clients said to be "done." If, after a predetermined event (e.g., a predetermined amount of time), the server does not receive a "done message" from certain clients and all NAKs have been serviced, the server sends to those clients a status request message and sends any missing frames to clients needing more data. Any client that still is unresponsive can be sent the file in, for example, a unicast transfer to that client from the server at a later time.

As the server passes block boundaries (i.e., $B_1$, $B_2$, $B_3$ and $B_4$ in FIG. 4), the individual clients preferably send "multiple selective reject negative" acknowledgments ("Nak") for each block. These acknowledgments from the clients for each block are received at the server sometime after the boundary of that block is passed. Positive acknowledgements are implicit. A multiple selective reject negative acknowledgment for a particular block means that one or multiple frames in that particular block were received in error, or were not received at all by those clients indicating that the network did not deliver them for some reason. Thus, acknowledgments sent to the server indicate which frames were received in error or not received.

On subsequent passes (i.e., after the first pass shown in FIG. 4), clients only respond with negative acknowledgments for blocks again not received correctly. Since the server sends pieces (frames) of the file needed by various clients to all clients in subsequent passes, many of the clients will have already received it correctly on the first pass and thus will ignore it.

In general, all information returning back to the server from the clients may be transmitted on a return path which is separate from the path(s) which the server uses to transfer the frames to the clients. However, for the purposes of this description, the communications link 24 (FIG. 2), or other path which allows the server and the clients to communicate, should generally be taken to mean both the server-to-client link and the return client-to-server link.

The server maintains various information about the transfer and the participants in the transfer. In the preferred embodiment, this information is maintained by the server in the form of data structures or lists. The server maintains and uses this information to record and determine the status of the file transfer.

The server also maintains a frame data structure which indicates all selective rejects on individual frames from all clients. If multiple clients missed the same frame, the frame data structure would indicate only that the frame was missed. That is, the frame data structure is not maintained on a client-by-client basis by the server. It generally is undesirable for the server to maintain a detailed list of missed frames on a per client basis because such a scheme would use an inordinate amount of memory, particularly when a large number (e.g., 1000 or more) of clients are involved in the multicast. For example, it might be that one or more of the clients either did not receive or received in error frames twenty and twenty-five of Block$_1$, frame one of Block$_2$, certain frames of Block$_3$, etc. If the frame status maintained by the server indicates that a particular frame of a particular block needs to be retransmitted, it will be true that at least one of the clients has not acknowledged successful completion of that particular block. After the server has sent the entire file once, the server would then pass through the frame status information and resend only the times listed therein. This would continue, pass after pass, until all clients had sent "done messages" and the frame status list is empty (or the maximum number of rounds, or maximum time, had been reached).

Note that for any given pass, if any negative acknowledgment does not get back to the server, the client will send back to the server the same reject and retransmission request messages during the next pass by the server. This means that if a certain client is not being heard by the server, that client will have to participate longer but that client will not appreciable impact the rest of the receiving clients.

Another piece of information stored at the server is statistics on the multicast group. When a transmission is completed, summary information is provided on the transmission that can aid an operator in determining system performance problems and/or the performance problems of a particular client.

Multiple Passes Through the File:

Once the file has been completely processed once (i.e., after the first pass or round), the transmission process according to the invention will increment a pass counter and then scan the frame status list in the sewer for the first block in which there was an error. Upon finding this first-error block, the server will resend the missed packets in that block. Negative acknowledgments for these missed packets will, as described previously, be generated by the clients when they detect an error in a block. This is consistent with the first pass. All selective reject negative acknowledgments are indications of state and are therefore not specific to a pass though they may change with each pass. In a preferred embodiment, the multiple selective reject negative acknowledgments are in the form of bitmaps where the entire word represents a block and each bit in that word represents a different one of the frames which make up that block.

Transmission Abort:

If, during the transmission, a fault is encountered which cannot be rectified, or if the operator manually aborts, a transmission abort sequence will be initiated. This sequence entails the repeated transmission of an Abort message for a certain interval (e.g., for an interval which is specified in a transmissions file). The receivers acknowledge the abort message and can take action to, for example, either save the context for a potential resumption (i.e., restart) of the transfer or reinitialize the context to prepare for another transmission. There is a facility which allows the user to initiate a transmission abort. A reason code can be set to either suspend or initialize. In the former case, the transmission may be resumed or restarted at a later time, and, in the latter case, the clients will be requested to reinitialize their contexts.

COMPLETION

The server detects completion of individual clients by receiving a "done message" from a client. The client knows it's done as soon as it has all blocks of the file, but the client must continue to send "done messages" until the server confirms completion. The server confirms that a client is "done" by placing that client's address in a "done list" and sending the list out to the clients. When a client sees its address listed in the "done list," it knows it has completed the transfer. The client will then update its transmission log to indicate that the transfer has been successfully completed.

An ability to abort a transfer from the server or client is included. An abort packet provides the server and client with the ability to abort prematurely a transfer. If the client sends an abort, the server removes the client from the group. If the server aborts, the transfer can be restarted without sending the full file on the first pass.

Status Requests:

If, after the first pass, the server has not received either a DONE or NAK from a client, a query is sent directed to those clients whose status is not known. The responses are in the form of a standard response message. They will include a bitmap describing the errors if there are errors to report.

Congestion/Flow Control:

As large "internets" become multicast enabled, it will become more common to find multicast groups that desire information to have different transmission links to the members of that group. These different links may have different capacities, which may be greatly divergent from each other. For example, one member of the group may have a link capacity of over 1 Mbps while another may only have 56 Kbps. In general, knowledge of these link capacities will not be known by the sender (e.g., the server) of the transmission. Thus, it is desirable to be able to determine the link capacities on the fly, and provide a flow control mechanism to prevent overload/congestion of the network while at the same time not inhibiting the efficiency of the data transfer protocol.

The data transfer protocol described herein includes the concept of blocks, each one of which can contain hundreds or thousands of frames. Clients (recipients) are obliged to send a multiple selective reject NAK at block boundaries if any frames are missing or in error in that block. For flow control purposes, it is desirable to gain knowledge of missed/erroneous (i.e., dropped) frames as soon as practical, so flow control decisions can be made. Changing or variable block sizes is a way to accomplish this with the data transfer protocol of the invention, and this involves starting with a relatively small block and increasing block size during file transfer to keep current scalability by reducing client acknowledgements. Another, preferred way to accomplish this with the data transfer protocol of the invention is to keep the block sizes all the same (homogeneous block sizes) but let the server send out status requests before a block boundary occurs so that clients respond with NAKs before the block boundary. This latter technique is the most flexible, as NAKs may be solicited at any time, as opposed to just at block boundaries which is the case with the former technique. With either of these two techniques, NAKs are solicited early in the transfer.

In the "variable block size" method (the first technique mentioned in the preceding paragraph), the first block may be relatively small, e.g., 100 frames. Subsequent blocks increase by a factor of two each time. Block sizes are increasingly doubled until the maximum block size is reached or the file reaches its end.

In the "status request" method (the second technique mentioned previously), the server solicits NAK responses at points where it desires, and these points are not at block boundaries. With this preferred embodiment for congestion or flow control, status requests are sent at increasingly longer intervals.

With both methods, transmission rate or transfer rate is set as described herein. However, rather than a fixed transfer rate, the settable rate represents an upper bound for the transfer rate. After the first block (with the variable block size method) or when a status request is received (with the status request method), NAKs are sent to the server by clients that have dropped frames, and this is an indication of congestion by those clients to the server.

If there are NAKs, the fact that they are directly related to the instantaneous capacity of the particular link can be used to determine link capacity for all of the links that show congestion based on the following equation:

((#frames sent-#frames NAK'd)/#frames sent)*transfer rate=link capacity.

Figure 6:
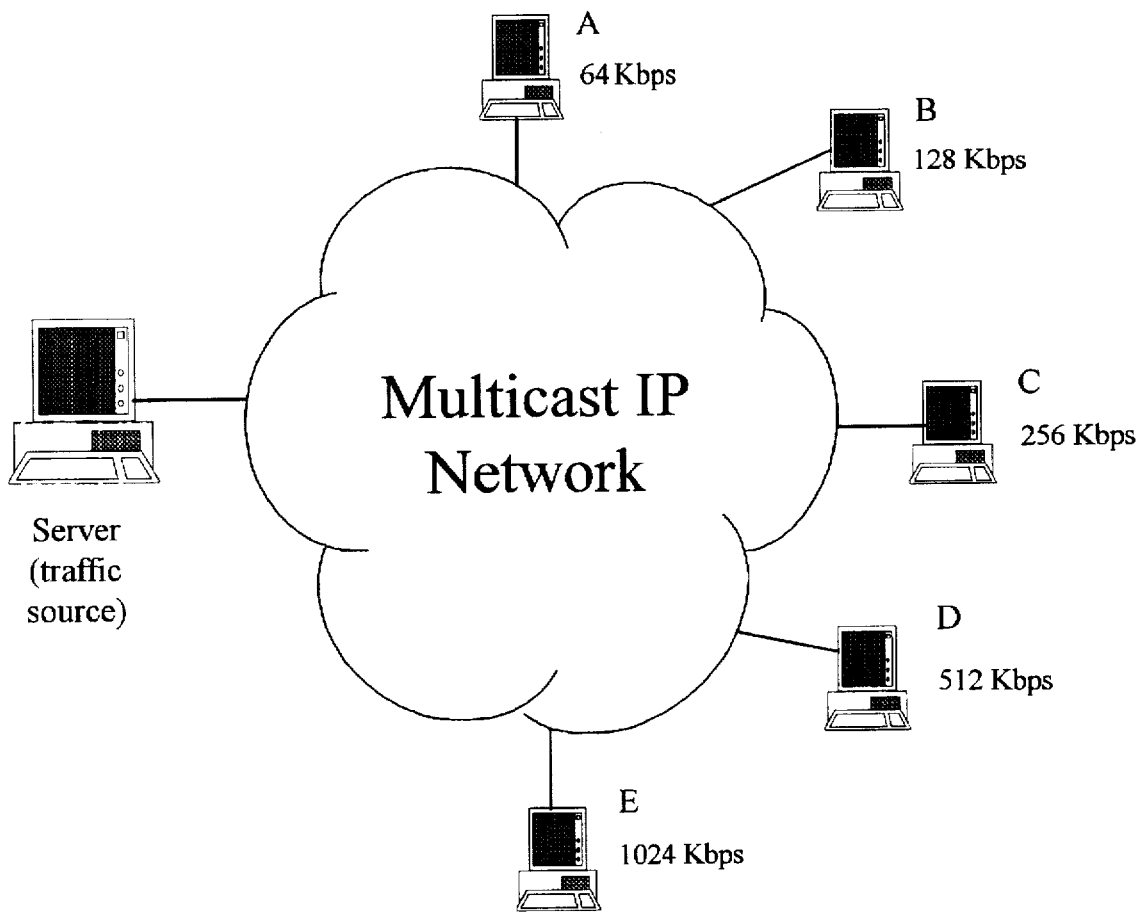
FIG. 6 is a diagram of a heterogeneous multicast network with members of a multicast group connected by different capacity links.

In the heterogeneous multicast network of FIG. 6, link speeds range from 64 Kbps to 1024 Kbps, a large difference in link capacity. Assuming no other traffic, if the transfer rate were set for 150 Kbps, the block NAK for block 1 from client A On the variable block size method) would indicate about 58 frames dropped for the first block. Using the above equation, the instantaneous link speed is calculated to be 63 Kbps. The block NAK from client B for block 1 (in the variable block size method) would indicate about 15 frames dropped for the first block. Again using the equation, the instantaneous link speed for the link to B is calculated to be 127.5 Kbps. With other traffic present, the number of frames dropped would be higher resulting in a smaller calculated link speed.

A Group Threshold parameter may be set by the user. The Group Threshold is the limit, expressed in percent of dropped frames, by a particular client that is allowed for continuing participation in the multicast group. If the Group Threshold is set to 25%, it means that any clients in the group that have a frame drop percentage higher than 25% will need to take action so that the rest of the group is not adversely affected. In the example of FIG. 6, client A with 58% of the frames dropped would need to take action. Clients will have enough information to make that decision because the transfer rate and Group Threshold parameters are transmitted to clients in the Announce message. Clients which detect that their frame drop rate exceeds the threshold may take one of the following actions:

1. Leave the Group and request from the server to be put into a lower speed group, with the group speed specified based on the measurement made at that client;
2. Leave the Group without requesting further delivery, meaning that this client misses this transmission; and
3. Suppress NAKs until a Status Request message is received from the Server, allowing the rest of the group to finish without being held up by excessive retransmissions from a high frame loss client (the transfer rate for retransmissions to this set of clients could be lower to reflect their lower capacities).

In the example of FIG. 6, the next highest percentage of frame drops comes from client B at 15% which is under the Group Threshold. This number represents a factor to which the whole group can adjust without undue performance degradation. The server's transfer rate for the group is then dropped by 15%, or a higher or slightly higher percentage, to accommodate client B.

Figure 8:
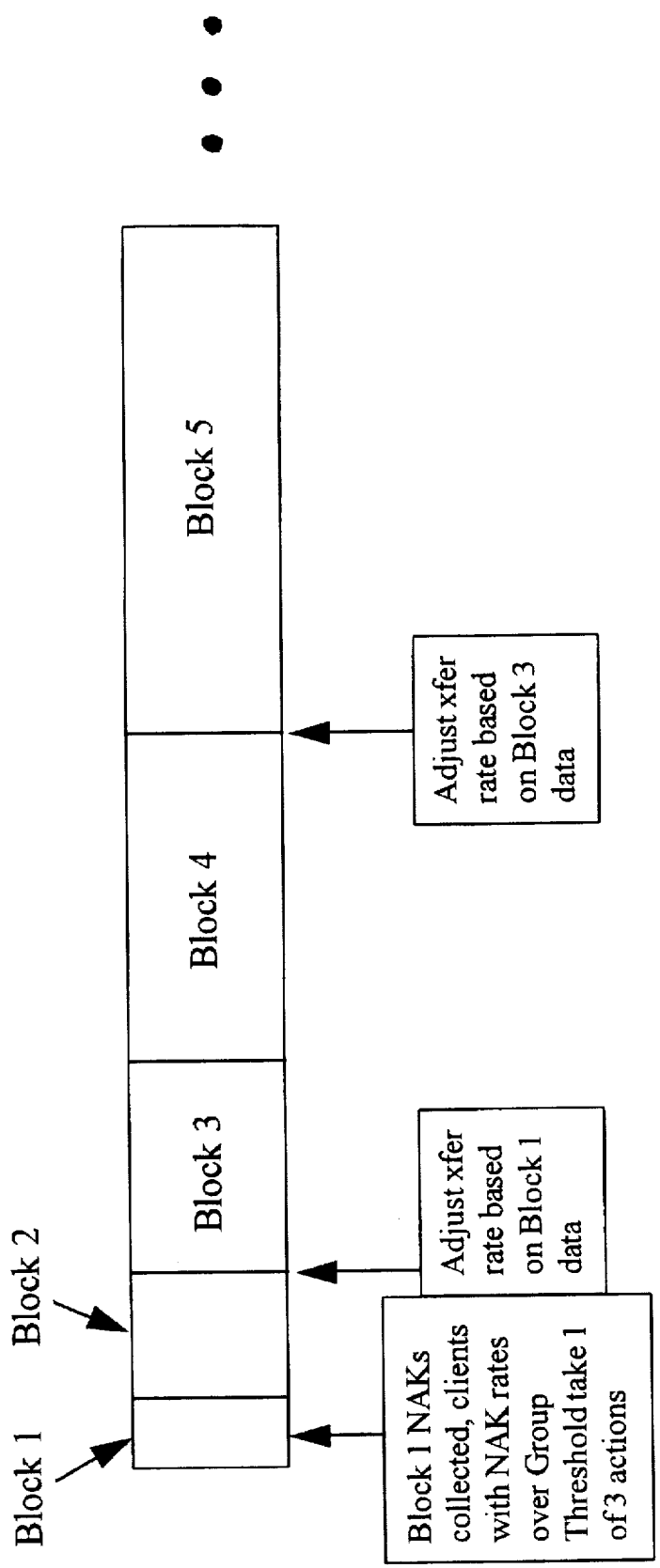
FIG. 8 is a diagram related to congestion/flow control using a variable block size method.

The timing of the variable block size method is given in FIG. 8. As soon as information at a client indicates its frame drops exceed the Group Threshold, that client must take one of the three above-listed alternative actions so that the group transmission is not adversely affected. The adjustment of the group's transfer rate is performed after the second block has been sent, starting with the beginning of block 3. Transfer rate changes are implemented at block boundaries to provide accurate data on a block basis from the block NAKs. The file transfer then proceeds with the transfer of block 3, which is set to be twice as large as block 2, just as block 2 is twice as large as block 1. This is followed by block 4, which is twice as large as block 3, and so on until the maximum block size is reached or the file reaches its end, whichever occurs first. However, if NAKs from the group after block 3 indicate the worst client exceeds a Rate Threshold parameter (configurable), then the rate is further adjusted for block 5 transmission. The Rate Threshold is the minimum frame drop percentage for which transfer rate adjustments for the group are performed. For example, a maximum frame drop percentage of 1% from the clients would not warrant an adjustment so the Rate Threshold would typically be set to a number above 1%.

Figure 9:
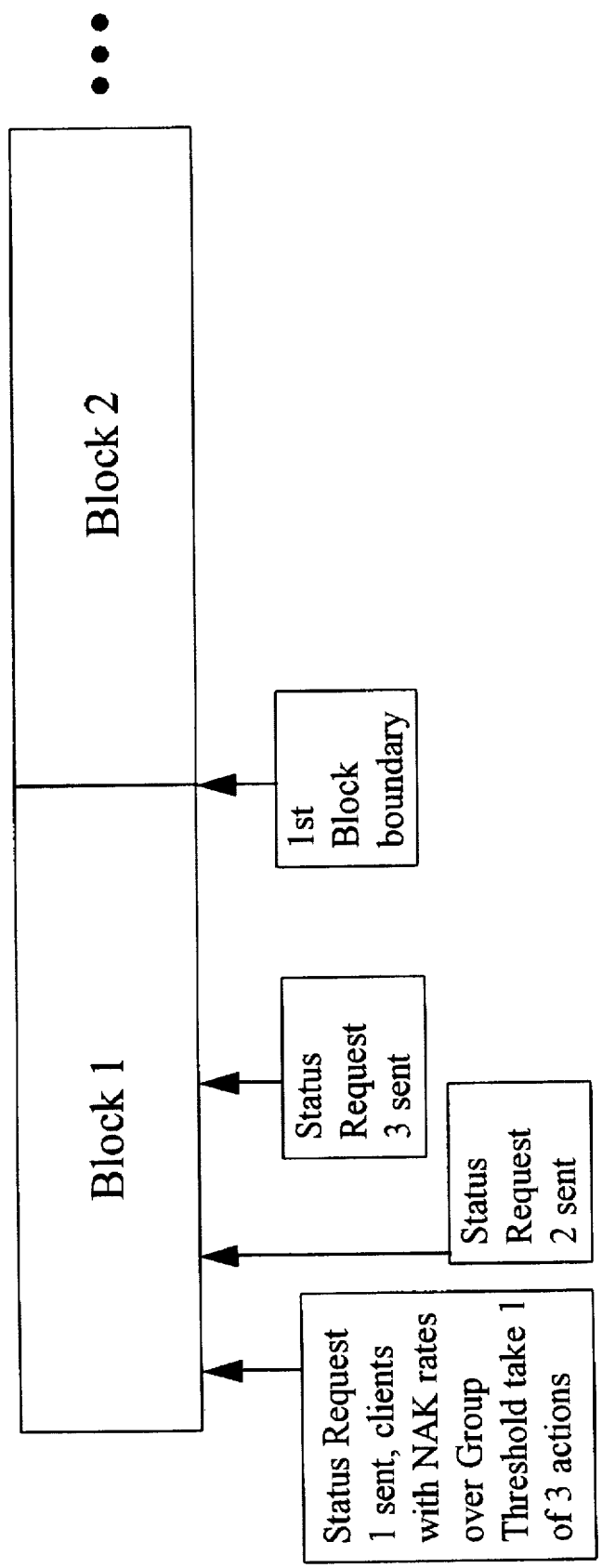
FIG. 9 is a diagram related to congestion/flow control using a preferred status request method to solicit negative acknowledgements from clients before block boundaries.

In the status request method, the blocks are a uniform size and status requests are sent by the server to request NAKs before block boundaries are reached. Referring to FIG. 9, an equivalent scenario to the one just described for the varying size block method is depicted except now (in FIG. 9) the block sizes are homogeneous. In one example, the first status request is sent after 100 frames of the transfer, the second after 200 more frames are sent, etc. Client NAKs are sent back to the sewer at exactly the same times as in the variable block size method. However, there is the added flexibility with the status request method that status requests are sent at any time desired rather than having to wait for a block boundary to receive NAKs as is the case with the variable block size method.

With either the variable block size method or the status request method, it generally is not desirable simply to delete group members and leave them hanging. Deleted group members can be collected into another group operating at a lower transfer rate. This lower transfer rate may be determined by the calculation on link capacities performed by clients who leave the group. This group can then be set up at a matching transfer rate and a new transfer can be initiated.

Both the variable block size and the status request methods of the flow control process can be made automatic.
Multicast:

Multicast can be in two forms: application layer (AL) multicast where the network still delivers data to the entire broadcast group, and multicast IP where the network routes traffic based on multicast routers and Internet specification RFC 1112 is implemented in the clients.

In both cases, multicast groups are set up under initiation of the server. The server sends notifications on a unicast basis to clients to inform them of membership in a particular multicast group. These multicast groups can be set up and dismantled rapidly, allowing for a dynamic configuration of multicast groups. For example, a multicast group could be set up to be only in place for the transmission of a particular file, after which time the group was dismantled.

With AL multicast, the network still delivers traffic on a broadcast basis, but clients not in the group discard the data not destined for it. When the group is set up, security keys may also be disseminated so that clients outside the group cannot read the data even if it happened that the data was not discarded at that node (note that this could also be deployed with multicast IP). Also, with AL multicast, the IP address remains a global or network-based broadcast address. As with broadcast, this address becomes mapped to a broadcast address in the link layer protocol, e.g. a broadcast SMDS address. A multicast header is selected for the group and becomes the group differentiator.

With multicast IP, the network is a router network where the routers support Class D multicast IP addresses and multicast routing. The clients support RFC 1112, "Host Extensions for IP Multicasting". RFC 1112 provides for host notification of their presence to the nearest multicast router for the purpose of update of router tables.

A functional description of the above-described invention is provided below.

Referring back to FIG. 2, which generally can represent any broadcast or multicast IP router-based network, a purpose of the invention is to enable the simultaneous transmission of small or large data files (e.g., files up to 2 gigabytes or more in size) by a server 20 to up to 5000 or more receiving nodes 22 over a wide area network (WAN) connection 24. The invention also is able to work over local area networks and other types of communications links, as described previously. The transmission medium 24 can be any type which supports the TCP/IP protocol stack in the preferred embodiment. Other protocol stacks could also serve as the communications environment for the invention.

Multicast can be supported in two ways: AL multicast and multicast IP, as mentioned previously.

Files to be transferred to the clients can be loaded onto the server 20 via tape (e.g., the tape drive 66 of FIG. 5) or, if the files are small enough, by floppy (e.g., the floppy drive of FIG. 5). Also, files to be transferred can be loaded onto the server 20 via FTP (File Transfer Protocol), or some other unicast transfer mechanism, from the source of the file over a LAN or other network, for example. The files generally can be in any format. The data fie is then read in from the tape or floppy into a file system of the transmission server 20. Note that the server 20 must have sufficient space available to read in an uncompressed copy of the data file. For both services, the data file also can be encrypted so that noneligible receivers cannot receive and use the data file. Each transmission file preferably is uniquely identified. There preferably is an indication as to its content and time of generation. The input files to the process can be over 2 gigabytes in size, and the system can also handle files much larger than 2 gigabytes.

The file can then be stored on the server 20 and prepared for transmission. Data from previous transmissions will need to be readily available on the server 20 for some period of time in case they need to be retransmitted. A mechanism for accessing the data is provided such that the data can be readily queued-up for retransmission.

For efficiency, the file is transmitted in blocks. The size of a block is derived from the largest packet (or block size can be selected by the user) which can be transferred over the communications path 24. Its derivation is based on the fact that the clients will need to indicate to the server which of the packets in a block they failed to receive. One way, and generally the simplest way, to do this is to send a bitmap indicating by a bit setting positionally which packets were not received. The size of the block therefore is approximately the number of packets which can be acknowledged in a bitmap which itself can be contained in a packet. For example, if the packet size were 256 bytes, then the most bits a packet could contain would be 256(bytes/packet) * 8 (bits/Byte)=2048 (bits/packet) which means that the largest allowable block size would be a block having 2048 packets.

Although receiving nodes 22 can be interfaced to an Ethernet LAN at 10 Mbps, WAN links are often of much lower speeds than that. Thus, an explicit transmit data rate is settable/configurable.

Receiving nodes can each experience resource problems either prior to or during a transmission. Receiving nodes are enabled to query their resources prior to a transmission and determine if they have the facilities to receive the data. If not, then they should either reinitialize space which is dedicated for the transmission or should indicate that they cannot participate in the transmission and corrective measure can be undertaken through different channels. A facility could be provided where the sewer can force the availability of disk space remotely to allow the transfer of the file to take place.

The receivers 22 must also be aware of what they are listening for. When a datagram is received on a dedicated channel, the node 22 must determine if it is being addressed. An issue can arise when this application is being used by more than one transmission server 20. There must be a way of guaranteeing that a receiving node 22 is participating in exactly one transmission at a given time. By dedicating a UDP port to a server 20 and also relating an encryption key to that server, it is ensured that a receiving node employing a promiscuous mode tap on the network 24 will not have the ability to be able to interpret the transmitted data.

Some reference information is maintained on the transmission server 20. There preferably is a list of all the potential receiving nodes in the network. Enough reference information preferably is available to allow the information provider to manage the clients in the case of service failures, problems, etc. There preferably will be a transmission database where an encrypted compressed data file is maintained ready for transmission. The transmission database contains the prepared data along with descriptive information of up to, for example, 70 bytes identifying the content of the files.

Each transmission preferably has a completion status indicator record and a log of all errors encountered during the transmission. There preferably also is an event file with a list of all the nodes for which the transmission failed, who to call, and why it failed.

At any point in time during the transmission, an operator is able to interrogate the status of the transmission as it applies to the server 20 and each of the receiving nodes 22. Alerts are generated if there are problems communicating to certain clients or other problems. If any intervention is indicated, the operator is allowed to initiate the corrective action.

For ongoing maintenance and management of the service, the operator is enabled to maintain the list of receivers, transmission groups, transmission file descriptors, transmission parameters, and transmissions database. A background process will maintain the environment and both age data and delete it according to housekeeping parameters, if enabled by an alerted operator.

Data transmission according to the invention has been described above. Further aspects of the invention are described hereinafter. These further aspects include: SETTABLE TRANSMISSION RATE; MULTICAST GROUPS; MULTICAST PING; MULTICAST NETWORK PROBE; SPEED GROUPS; and NEGATIVE ACKNOWLEDGEMENT COLLECTION.

SETTABLE TRANSMISSION RATE

As mentioned previously, it is possible to set the data transmission rate. The example given previously illustrated when a settable rate is useful. In that example, the receiving nodes 22 are interfaced to an Ethernet LAN having an available bandwidth of 10 Mbps and the WAN links connecting the LAN to other networks are of much lower speeds than 10 Mbps. In such a case, the data transmission rate would be set, according to the invention, to match, for example, the speed of the slowest WAN link.

In accordance with the invention, for any given file transfer session, the data transmission rate can be set ahead of time. More specifically, the maximum bit rate at which data is transmitted during the session is settable. In a preferred embodiment, it is set by setting a parameter to an integer value that represents the bit rate in kilobits per second (Kbps). For example, if this rate parameter has the value 56, it corresponds to a maximum bit rate of 56 Kbps. The rate parameter can be set to any value that corresponds to the available bandwidth of the link connecting the source to the destination or to a value representative of a rate less than the available bandwidth. That is, if the available bandwidth is 1 Mbps, the rate parameter can be set to any value between zero and one-thousand, where 1000 Kbps equals 1 Mbps. This ability to explicitly set the transfer rate allows long (in time) file transfers to coexist with other applications on the network without hogging all or substantially all of the bandwidth of the network.

MULTICAST GROUPS

"Multicast" is defined hereinabove as the case when the server node 20 sends data (e.g., a file) to a subset of all of the client nodes 22 connected to the network 24. It is also disclosed hereinabove that multicast transmission can be in two forms: "application layer (AL) multicast" and "multicast IP". AL multicast is used when the network does not support the Internet specification RFC1112 but does support broadcast. If multicast IP is supported by the network according to RFC1112 and multicast IP routing, it is recommended over AL Multicast. Multicast IP is used when members of the group must support multicast and routers in the router network must also support some kind of multicast routing protocol (e.g., DVMRP, MOSPF, or PIM). Unlike AL multicast, Multicast IP is a true multicast protocol where only members of the multicast group receive the transmitted data.

For each file transfer, a multicast group can be defined during the ANNOUNCE/REGISTRATION aspect of data transmission, as describe hereinbefore. As stated, the server maintains various information about the file transfer and the participants or group involved in the transfer. In the preferred embodiment, this information is maintained by the server in the form of data structures or lists. The server maintains and uses this information to record and determine the status of the file transfer during the DATA TRANSFER stage. The client status structure includes a list of the status of the participants of the multicast group based on data from the announce registrations that are received by the server.

Multicast group management is the process of assigning clients to multicast groups. The task of organizing and manipulating the list of clients in each group is the responsibility of the application program that initiates file transfer in the first instance. The application program generally provides ease-of-use features such as associating a name with a client IP address, assigning a name to a group, etc. Group management is required only at the sending station, e.g., at the server. A multicast group is specified when a sending station wants to transmit a file. The group is identified by a list of client IP addresses, one address for each client in the multicast group.

There are two options for multicast groups: dynamic and static. For dynamic multicast groups, when the transfer is complete, the group dissolves. Dynamic multicast groups are formed with the ANNOUNCE messages using multicast group Class D addresses. In contrast to dynamic multicast groups, with static multicast groups, all of the members of the group remain members of the group when the transfer is complete. Static multicast groups are formed by the server on a unicast basis and/or by using a common Class D address to set up configurations.

MULTICAST PING

The "ping" utility in TCP/IP is very useful in determining connectivity between two points in a TCP/IP network (i.e., in determining if two points are actually connected). In TCP/IP, a ping packet is sent to the desired end point which reverses the addresses and sends it back to the sender. The roundtrip time delay is also measured, and this is a measurement of the time it takes for the ping packet to travel from the sender to the desired end point and then back to the sender.

It is also desired to provide a multicast ping utility, where all the members of a multicast group respond to the ping packet or ping request. Clients or hosts that support multicast IP (RFC1112) will respond to a ping request with a Class DIP address as the destination address. However, in known multicast implementations, the sender of the ping request only displays the first response it receives to its ping request. That is, known multicast ping techniques do not make a network connectivity measurement.

A "Multicast Ping" feature of the invention displays all multicast responses to a ping request thereby providing the network connectivity information from source to group recipients, and the roundtrip time delay information for each multicast group recipient. In a preferred embodiment, this feature uses the standard ping ICMP messages.

As an enhancement according to the invention, it is also possible to use the Announce/Registration facility described hereinbefore as another form of the "Multicast Ping" feature. With this enhancement, Announce/Registration ping messages determine connectivity to the application layer of the group recipients and back to the sender and roundtrip time delay information for each group recipient.

The "Multicast Ping" feature thus allows network connectivity and roundtrip delays to be determined by the sender for members of a multicast group.

MULTICAST NETWORK PROBE

Multicast (the sending of one to many, but not to all) data networks are just now starting to be implemented. Multicast IP, in particular, is new in router networks and can provide the mechanism for creating multicast groups over networks of all kinds, e.g., frame relay, SMDS, LANs, satellite, wireless. The Internet also has the "Mbone" (multicast backbone), a part of the Internet that supports multicast IP.

The Mbone was started in early 1992 and has grown so that at the beginning of 1995 over 1500 subnets of the Internet were multicast enabled. To this point, the Mbone has been used as an experimental network by Internet researchers who have tested PC and workstation based video conferencing and whiteboard multicast applications, as well as Internet "radio" and other experimental applications. Multicast IP routing on the Mbone was initially implemented in workstations using the multicast routing protocol DVMRP; however, parts of the Mbone have had their routers upgraded so they are multicast enabled. It is anticipated that within 5 to 6 years the Internet will be fully multicast enabled using the routers in the Internet.

As more of the Internet becomes multicast enabled, it will be used for mainstream multicast applications rather than as an experimental research tool. As this occurs, tools will be needed to facilitate usage.

and protocol described herein. After Announce/Registration to a multicast group of members A through E is used as a means to determine connectivity (i.e., to determine which members are actually connected to the server) in accordance with, for example, the "Multicast Ping" feature of the invention described in the preceding section, a test suite of small files are sent in sequence at different speeds to the group members. For example, a 400-frame test file may be sent first at 64 Kbps, then 128 Kbps, then 256 Kbps, then 512 Kbps, and finally at 1024 Kbps. Client negative acknowledgements will be received and stored at the server as shown in Table 1 below, assuming no other traffic on the links.

TABLE 1

| | Test Results with 400-frame Test File | | | | |
|---|---|---|---|---|---|
| Speed Sent | # Naks for A | # Naks for B | # Naks for C | # Naks for D | # Naks for E |
| 64 Kbps | 0 | 0 | 0 | 0 | 0 |
| 128 Kbps | 200 | 0 | 0 | 0 | 0 |
| 256 Kbps | 300 | 200 | 0 | 0 | 0 |
| 512 Kbps | 350 | 300 | 200 | 0 | 0 |
| 1024 Kbps | 375 | 350 | 300 | 200 | 0 |

One large difference between the Internet and a private network is that the Internet is a very heterogeneous network. It is a network of networks, and there are large differences in the different parts of the network operated by different organizations. In contrast, many private networks are set up to be relatively homogeneous, with much control by the operator of the private network as to the architecture of the network.

Since the endpoints in the multicast network are likely to be linked at different rates with different networks, and congestion in the network will be different at different parts of the network, it is desirable to be able to gain knowledge of the capacity of the attached links in the multicast group, and to test performance at that capacity. A "Multicast Network Probe" feature of the invention is designed to be able to probe the Mbone or other large heterogeneous multicast network from the traffic source and measure the capacity of the individual links quickly from that traffic source.

Referring to FIG. 6, a heterogeneous multicast network (e.g., the Mbone portion of the Internet) has a multicast group with five members, A through E, where each member of the group is connected by a different capacity link, i.e., a different rate link. Member A of the group is tied to the network with a 64 Kbps (kilobits per second) link, B with a 128 Kbps link, C with a 256 Kbps link, D with a 512 Kbps link, and E with a 1024 Kbps link. The nature of these link connections is unknown to the server (i.e., the traffic source) because connections to the Internet can be at many different speed links.

It is desirable for the traffic source to know the characteristics of the links to destinations so that it can optimally determine how to perform the multicast transfer of information to the destinations. If the application is a video conference, it may be determined that the quality to A at 64 Kbps may be unacceptable, but the rest could participate at 128 Kbps. Similarly, if file transfer is the application, groups D and E could make up a group operating at 512 Kbps transfer rate, while groups A, B, and C could operate at 64 Kbps without exceeding network capacity.

In accordance with the invention, the mechanism to probe the network to determine remote link capacity is the system Referring to Table 1, the first run at a speed of 64 Kbps results in no negative acknowledgements (i.e., NAKs or Naks) for any of the group members because all links support 64 Kbps or greater.

The second run is at 128 Kbps, twice that of the first. In this second run, client A has 200 NAKs, meaning that half the frames are lost. This means that the speed of client A is 64 Kbps (i.e., ((400−200)/400)*128 Kbps=64 Kbps). Clients B through E exhibit no frame loss in the second run, and thus the speed of each of those clients is at least 128 Kbps.

In the third run, the speed of transfer is 256 Kbps, and clients A and B exhibit 300 and 50 lost frames, respectively. Thus, from this third run, client A's speed is 64 Kbps (i.e., ((400−300)/400)*256 Kbps=64 Kbps) which confirms the measurement from the second run. Also, in the third run, client B's speed is 128 Kbps (i.e., ((400−200)/400)*256 Kbps=128 Kbps). Clients C through E have no errors in this third run, and thus they each operate at least as fast as 256 Kbps.

In the fourth run, the speed of transfer is 512 Kbps. Client A exhibits 350 lost frames so measures (400−350)/400*512 Kbps or 64 Kbps which checks with the previous measurements. Client B exhibits 300 lost frames which measures ((400−300)/400)*512 Kbps or 128 Kbps which also checks with previous runs. Client C exhibits 200 lost frames which measures ((400−200)/400)*512 Kbps or 256 Kbps.

In the fifth run, the speed of transfer is 1024 Kbps. Client A exhibits 375 lost frames which measures to ((400−375)/400)*1024 or 64 Kbps as before. Client B measures ((400−350)/400)*1024 or 128 Kbps, and client C measures ((400−300)/400)*1024 or 256 Kbps. Client D measures ((400−200)/400)*1024 or 512 Kbps. Client E has no drops which means that its speed is at least 1024 Kbps.

Thus, for each of the five runs, the capacity of a given link is given by the following equation:

((#frames sent-#naks)/#frames sent)*speed of transmission=link capacity.

This test technique also will take into account the traffic on the link. For example, if a physical link is 256 Kbps and there is 128 Kbps of traffic on the link when the test is performed, the measurement will come up with a capacity of 128 Kbps, the remaining capacity when the traffic is considered.

Software for implementing these tests can also be used to test the quality of links given that the source knows the link speeds to each client. For example, in FIG. 6, the link speeds may be known and it is desired to test the links with relatively long test patterns to determine frame error rates. For example, a 100,000-frame test file could be sent at 64 Kbps to the group consisting of members A through E. The rate of transmission and the NAKs are stored at the source, and the number of NAKs from each client gives a measure of the quality (i.e., the frame error rate) of each link. It could be expected that A would have the worse quality as it is the most heavily loaded link, and E would be best as it is the least loaded. However, other factors could cause other results. Similarly, speeds can be increased and overloaded links may be deleted from the group to more heavily stress the higher speed links.

Thus, using the "Multicast Network Probe" feature of the invention, the capacity of individual links can be measured quickly by the server if the individual link capacities are unknown. Also, if the link speeds are known by the server, this feature of the invention can be used to determine the quality of each link (i.e., to determine the frame error rate of each link).

In accordance with this feature of the invention, the connectivity of the members of the multicast group is first determined by going through an ANNOUNCE/ REGISTRATION phase described hereinbefore. That is, the initial step is to determine which members of the group are connected to the server. Once the connected members are known, the test file transfer can begin to determine link speed or quality by the server sending a test Me to each member and recording the results (i.e., the number of negative acknowledgements for each group member).

SPEED GROUPS

With the knowledge of the capacity, speed, or bandwidth of each of the various links interfacing the server to the clients (made available by, for example, the "Multicast Network Probe" feature described in the preceding section), a list of these speeds can be stored by the server. The list can then be used to generate or define a plurality of client groups based on link speed. For example, there may be two speed groups where one includes a client connected to the server over a link (or effective link) having a maximum possible speed of 64 Kbps and where the other one includes a client connected to the server over a link (or effective link) having a maximum possible speed of 1024 Kbps. The second group is thus much faster than the first group. What speed group a particular recipient is in affects the transfer of data to that recipient. During the initial pass of data transfer according to the invention, each of the recipients in the second, faster speed group will be sent all of the frames by the server, and each of the recipients in the first, slower group will be sent only every sixteenth frame (1/16) sent to the second group. This means that after the first pass, the server has sent all frames to the second group recipients, but it has only sent one-sixteenth of the total number of frames to the first group. The remaining portion of the frames not yet sent to the first group (i.e., 15/16 of the frames) are then sent to the first group recipients on subsequent passes. The point being that once the server knows the capacity of each member of a group, the server can tailor the data transfer to take advantage of the higher capacity links and not slow down the transfer of data thereto.

NEGATIVE ACKNOWLEDGEMENT COLLECTION

As mentioned previously hereinbefore, the number of clients which can receive a file according to the invention can number in the thousands. Thus, the number of entries in the client status list maintained by the server can number in the thousands. File transfer according to the invention can be made more scalable. For example, it can be scaled to send a file to millions of recipients/clients instead of thousands of recipients/clients. In a preferred embodiment, these clients or recipients are members of a multicast group of clients.

The scaling feature is helpful to avoid a potential problem when the number of clients in the group become too large. The problem is when a large number of clients send back negative acknowledgements to the file sender (e.g., server) and effectively choke the sender with more negative acknowledgements than it can handle in a reasonable period of time. This causes the performance of the sender to drop as it needs to spend a significant amount of time receiving and processing the negative acknowledgements and it cannot attend to its other duties. This also clogs the link back to the sender to become jammed with the traffic of these negative acknowledgements.

Figure 7:
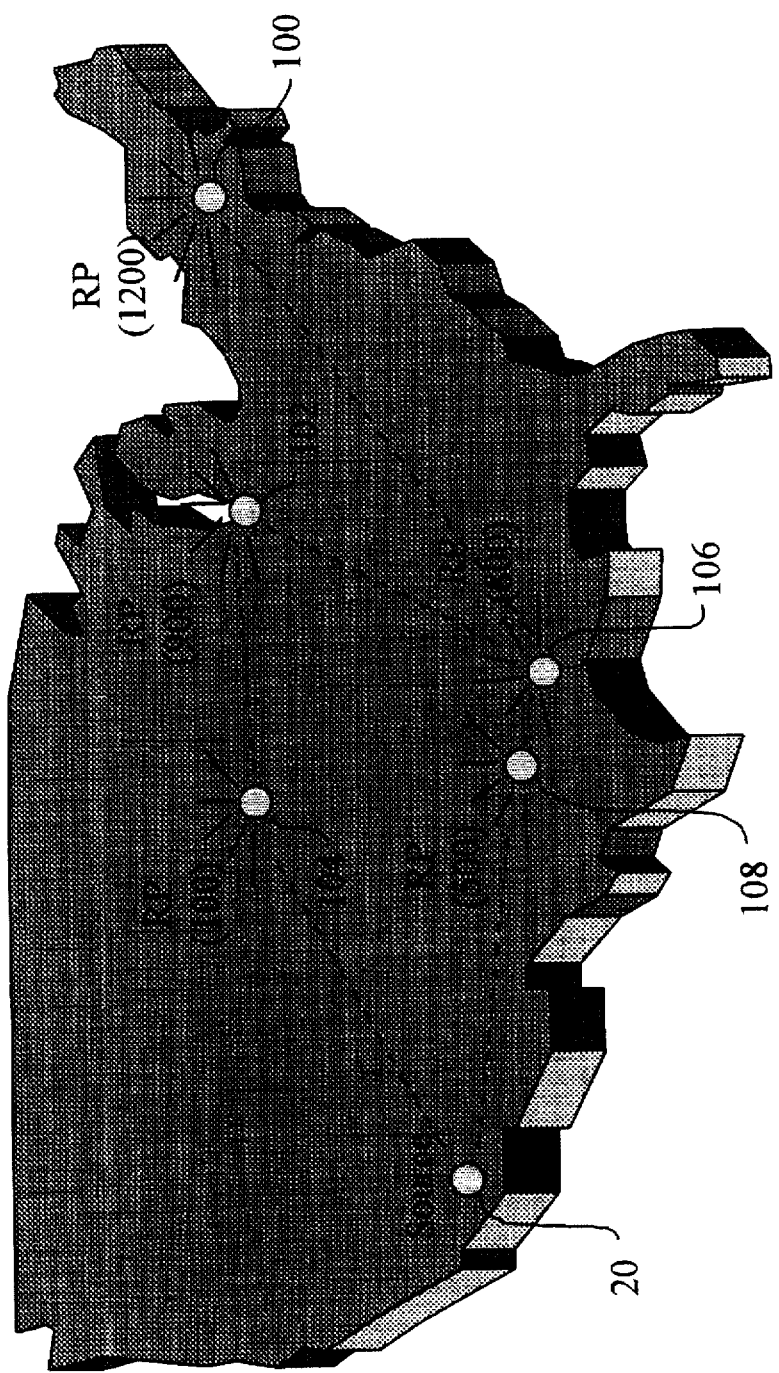
FIG. 7 is a diagram illustrating an acknowledgement collection feature according to the invention which increases sealability and allows millions of recipients to receive quickly and reliably data from a sender.

The solution to the problem is "negative acknowledgement collection" which in turn allows the number of client recipients to be dramatically increased from thousands to millions without clogging at the file sender/server 20. With this collection feature, certain clients or other network nodes act as "replication points" and collect block negative acknowledgements from other clients. In a preferred embodiment, these replication points (RPs) are routers. Referring to FIG. 7, five RPs are indicated across the United States, and the lines emanating from each RP are representative of the one or more clients connected to that RP. For example, RP 100 has 1200 clients thereunder, RP 102 has 900 clients, RP 104 has 100 clients, RP 106 has 800 clients, and RP 108 has 500 clients. The server or source 20 is located at another place in the United States. RP 100 collects all of the block negative acknowledgements from the (e.g., 1200) clients associated therewith or connected thereto. The other RPs 102, 104, 106, 108 do the same for their associated clients. For each RP, after it collects all block negative acknowledgements from all of its associated clients, that RP sends on to the .server 20, or to another RP in the chain heading to the server 20, just one acknowledgement message. That one message includes all of the block negative acknowledgements from all of the clients associated with that RP. When the server 20 eventually receives these collected block negative acknowledgement messages from the RPs, it sends back out on the next pass all of the frames negatively acknowledged. The RPs are responsible for receiving those subsequent-pass frames and forwarding them to the appropriate clients or other RP in the chain which will then forward them to the appropriate clients or other RP in the chain, etc.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A method for transmitting data over a communications link, comprising:
   (A) setting a maximum data transmission rate to a value less than or equal to an available bandwidth of the communications link;
   (B) partitioning the data into a plurality of blocks which each includes a plurality of frames;

(C) transmitting all of the frames to one or more recipients;

(D) during transmission, receiving acknowledgments from the recipients which include indications of frames requiting retransmission; and (E) repeating steps (C), (D), and (E) for only those times which the acknowledgments indicate require retransmission.

2. A method for quickly and reliably transmitting data to at least two recipients over a communications link, comprising:

(A) setting a maximum data transmission rate to a value less than or equal to an available bandwidth of the communications link;

(B) transmitting a plurality of frames of data over the link to the recipients until all of the plurality of frames have been transmitted;

(C) while performing step (B), receiving acknowledgments from one or more of the recipients, the acknowledgments including indications of frames requiring retransmission; and (D) after all of the plurality of frames have been transmitted, repeating steps (B), (C), and (D) for only those frames which the acknowledgments indicate require retransmission.

3. The method of claim 2 wherein steps (B), (C), and (D) are repeated, as recited in step (D), until no frames require retransmission.

4. The method of claim 2 wherein steps (B), (C), and (D) are repeated, as recited in step (D), until a predetermined amount of time has passed.

5. A method for transmitting data over a communications link, comprising:

(A) defining a multicast group of recipients to receive the data wherein the group includes a subset of all recipients;

(B) partitioning the data into a plurality of blocks which each includes a plurality of frames;

(C) transmitting all of the frames to the multicast group;

(D) during transmission, receiving acknowledgments from the recipients in the multicast group, the acknowledgements including indications of frames requiring retransmission; and (E) repeating steps (C), (D), and (E) for only those frames which the acknowledgments indicate require retransmission.

6. A method for quickly and reliably transmitting data to a multicast group of recipients over a communications link, comprising:

(A) defining the multicast group of recipients to receive the data wherein the group includes a subset of all recipients;

(B) transmitting a plurality of frames of data over the link to the multicast group until all of the plurality of frames have been transmitted;

(C) while performing step (B), receiving acknowledgments from one or more of the recipients in the multicast group, the acknowledgments including indications of frames requiring retransmission; and (D) after all of the plurality of frames have been transmitted, repeating steps (B), (C), and (D) for only those frames which the acknowledgments indicate require retransmission.

7. The method of claim 6 wherein steps (B), (C), and (D) are repeated, as recited in step (D), until no frames require retransmission.

8. The method of claim 6 wherein steps (B), (C), and (D) are repeated, as recited in step (D), until a predetermined amount of time has passed.

9. The method of claim 6 further comprising, prior to step (A), sending a ping request to all recipients and receiving responses from the recipients that are connected to a source of the ping request in order to determine which recipients are available to be in the multicast group.

10. A method for determining the capacities of communication links connecting recipients to a source, comprising:

(A) determining which recipients are connected to the source by the communication links, each recipient being connected to the source by a different one of the communication links;

(B) transmitting a plurality of frames of data from the source to the recipients determined in step (A) at a predetermined rate over the communication links until all of the plurality of frames have been transmitted;

(C) while performing step (B), receiving acknowledgments from the recipients determined in step (A), the acknowledgements including indications of frames requiting retransmission;

(D) storing the acknowledgements and the predetermined rate at the source;

(E) repeating steps (B), (C), (D), and (E) for a different predetermined rate until steps (B), (C), (D), and (E) have been repeated a predetermined number of times; and (F) determining capacity of one or more of the communication links from information stored at the source.

11. The method of claim 10 wherein step (A) is performed by the source sending a ping request to the recipients over the communication links and the source receiving responses from the recipients that are connected to the source, and wherein the recipients are members of a multicast group.

12. The method of claim 10 further comprising, alter step (F):

(G) transmitting a plurality of frames of other data from the source to at least one of the recipients which is connected to the source by one of the communication links determined in step (F) to have a first capacity; and (H) transmitting a subset of the plurality of frames of other data from the source to at least one other of the recipients which is connected to the source by one of the communication links determined in step (F) to have a second capacity where the first capacity is higher than the second capacity.

13. A method for determining the frame error rates of communication links connecting recipients to a source, comprising:

(A) determining which recipients are connected to the source by the communication links, each recipient being connected to the source by a different one of the communication links;

(B) transmitting a plurality of frames of data from the source to the recipients determined in step (A) at a predetermined rate over the communication links until all of the plurality of frames have been transmitted;

(C) while performing step (B), receiving acknowledgments from the recipients determined in step (A), the acknowledgements including indications of frames requiring retransmission;

(D) storing the acknowledgements and the predetermined rate at the source; and (E) determining frame error rate of one or more of the communication links from information stored at the source.

14. The method of claim 13 wherein step (A) is performed by the source sending a ping request to the recipients over the communication links and the source receiving responses from the recipients that are connected to the source, and wherein the recipients are members of a multicast group.

15. A method for determining the connectivity between a source and members of a multicast group on a network, comprising:

sending a ping request from the source over the network to all of the members of the multicast group;

receiving at the source responses to the ping request from all of the members of the multicast group; and determining, at the source, roundtrip delay for the ping request to travel to each of the members of the multicast group and back to the source.

16. A method for transmitting data, comprising:

(A) transmitting a plurality of frames of data from a source to at least one recipient which is connected to the source by a first communication link having a first capacity;

(B) transmitting a subset of the plurality of frames of the data from the source to at least one other recipient which is connected to the source by a second communication link having a second capacity where the first capacity is higher than the second capacity;

(C) transmitting the plurality of frames over the first link and the subset of the plurality of frames over the second link until all of the plurality of frames have been transmitted over the first link;

(D) while performing step (C), receiving acknowledgments from the recipients connected to the source by the first and second links, the acknowledgments including indications of frames requiring retransmission; and (E) after all of the plurality of frames have been transmitted over the first link, repeating steps (C), (D), and (E) for only those frames which the acknowledgments indicate require retransmission.

17. A method for quickly and reliably transmitting data to a large number of recipients, comprising:

(A) transmitting a plurality of frames of data over a link through a replication point to the recipients until all of the plurality of frames have been transmitted;

(B) while performing step (B), receiving and collecting acknowledgments from all of the recipients at the replication point, the acknowledgments including indications of frames requiring retransmission;

(C) passing on the received and collected acknowledgements from the replication point as an indication of frames requiring retransmission for all of the recipients;

(D) after all of the plurality of frames have been transmitted, repeating steps (A), (B), (C), and (D) for only those frames which the replication point has indicated require retransmission.

18. The method of claim 17 wherein steps (A), (B), (C), and (D) are repeated, as recited in step (D), until no frames require retransmission, and wherein the replication point comprises a router.

* * * * *